US009454146B2

(12) United States Patent
Abe

(10) Patent No.: US 9,454,146 B2
(45) Date of Patent: Sep. 27, 2016

(54) NUMERICAL CONTROLLER ENABLING INPUT OF RELATIVE TOOL DIRECTION TO WORKPIECE

(71) Applicant: FANUC Corporation, Minamitsuru-gun, Yamanashi (JP)

(72) Inventor: Kimio Abe, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 14/571,360

(22) Filed: Dec. 16, 2014

(65) Prior Publication Data

US 2015/0177726 A1 Jun. 25, 2015

(30) Foreign Application Priority Data

Dec. 20, 2013 (JP) .................................. 2013-264470

(51) Int. Cl.
G05B 19/19 (2006.01)
G05B 19/408 (2006.01)

(52) U.S. Cl.
CPC ........... *G05B 19/19* (2013.01); *G05B 19/4086* (2013.01); *G05B 2219/35415* (2013.01); *G05B 2219/35434* (2013.01)

(58) Field of Classification Search
CPC ..................................................... G05B 19/19
USPC .......................... 318/574, 570, 569, 567, 560
See application file for complete search history.

(56) References Cited

U.S. PATENT DOCUMENTS

| 4,503,373 | A | 3/1985 | Nozawa et al. |
| 5,604,677 | A * | 2/1997 | Brien ............................ 700/186 |
| 6,587,747 | B2 * | 7/2003 | Hirai et al. .................... 700/189 |
| 8,024,068 | B2 * | 9/2011 | Gray ...................... B25J 9/1602 |
| | | | 382/153 |
| 8,283,884 | B2 * | 10/2012 | Otsuki et al. ................. 318/572 |
| 2002/0002420 | A1 | 1/2002 | Hirai et al. |

FOREIGN PATENT DOCUMENTS

| JP | S57-75309 A | 5/1982 |
| JP | H04-271406 A | 9/1992 |
| JP | H07-36526 A | 2/1995 |
| JP | 2001-92516 A | 4/2001 |

(Continued)

OTHER PUBLICATIONS

Notification of Reasons for Refusal dated Jun. 2, 2015, along with its English-language translation, in corresponding Japanese Patent Application 2013-264470.

(Continued)

*Primary Examiner* — David S Luo
(74) *Attorney, Agent, or Firm* — Drinker Biddle & Reath LLP

(57) ABSTRACT

A numerical controller controls a five-axis machining machine that machines a workpiece attached to a table with three linear axes and two rotary axes. The numerical controller inputs a relative tool direction that represents a relative position of the tool direction with respect to the workpiece after the rotary axes are moved by a manual operation, as a vector, roll-pitch-yaw angles, or Euler angles. The numerical controller further converts the relative tool direction thus input into the rotary axis positions of the two rotary axes and drives the two rotary axes based on the rotary axis position thus converted.

8 Claims, 8 Drawing Sheets

(56) References Cited

FOREIGN PATENT DOCUMENTS

| | | |
|---|---|---|
| JP | 2003-44109 A | 2/2003 |
| WO | WO 2010/109536 A1 | 9/2010 |

OTHER PUBLICATIONS

Decision to Grant a Patent issued Dec. 22, 2015 in Japanese Patent Application No. 2013-264470 (3 pages) with an English Translation (3 pages).

* cited by examiner

STATE IN WHICH B-AXIS
IS 0 DEGREES

STATE IN WHICH B-AXIS IS
180 DEGREES (A) STATE IN WHICH B-AXIS IS 0 DEGREES (B) STATE IN WHICH B-AXIS IS 180 DEGREES ically, to a numerical controller enabling addition of a linear axis moving amount or a rotary axis moving amount by a manual instruction (such as manual handle feeding or jog feeding) with respect to the position of a rotary axis.

NUMERICAL CONTROLLER ENABLING INPUT OF RELATIVE TOOL DIRECTION TO WORKPIECE

RELATED APPLICATION DATA

This application claims priority under 35 U.S.C. §119 and/or §365 to Japanese Application No. 2013-264470 filed Dec. 20, 2013, the entire contents is incorporated herein by reference.

BACKGROUND OF THE INVENTION

1. Field of the Invention

The present invention relates to a numerical controller that controls five-axis machining machine including at least three linear axes and two rotary axes, and more particularly, to a numerical controller enabling addition of a linear axis moving amount or a rotary axis moving amount by a manual instruction (such as manual handle feeding or jog feeding) with respect to the position of a rotary axis.

2. Description of the Related Art

Japanese Patent Application Laid-Open No. 57-75309 discloses a technique to operate three linear axes, X, Y, and Z such that a relative positional relation is maintained between a tool center point and a workpiece with respect to movements of two rotary axes caused by a manual instruction. This technique is called three-dimensional manual feeding in a five-axis machining machine, in general. In this three-dimensional manual feeding, the actual positions of the rotary axes are manually input and the directions of a table and a tool axis are represented by the end point position of the rotary axes.

To achieve a direction of a tool with respect to the workpiece that is expected by the operator, the end points of the rotary axes have to be calculated based on the rotary axis constitution. For example, in the case of a table-rotation type five-axis machining machine illustrated in FIG. 1 (a master axis is represented by the A-axis, and a slave axis is represented by the C-axis), a direction of a tool with respect to the workpiece is defined as the tool direction viewed from the coordinate system moving with the workpiece. When both of the rotary axes are at an angle of 0 degrees, the vector of a direction of a tool with respect to the workpiece is (0, 0, 1).

However, when a direction of a tool with respect to the workpiece is desired to be the X-axis direction, that is, (1, 0, 0) as illustrated in FIG. 2, the A-axis=90 degrees and the C-axis=90 degrees have to be calculated from the rotary axis constitution. Furthermore, when the table posture is calculated in a machine with a rotary axis tilted as illustrated in FIGS. 3, 4, 5A, and 5B, tilt of the rotary axis has to be considered. It should be noted that the member marked as a balancer in FIGS. 3 and 4 is not directly related to the present invention and thus not shown in FIGS. 5A and 5B, and in FIGS. 6A and 6B described later.

SUMMARY OF THE INVENTION

An object of the present invention is accordingly to provide a numerical controller enabling an input of the relative direction of a tool with respect to a workpiece in manual feeding, in which a direction of a tool with respect to the workpiece can be specified as a vector, roll-pitch-yaw angles, or Euler angles not depending on the axis constitution.

The numerical controller according to the present invention controls a five-axis machining machine that machines a workpiece attached to a table with three linear axes and two rotary axes. The numerical controller includes a relative tool direction input unit and a rotary-axis position conversion unit. The relative tool direction input unit inputs a relative tool direction representing a relative position of the tool direction with respect to the workpiece after the rotary axes are moved by a manual operation, as a vector, roll-pitch-yaw angles, or Euler angles. The rotary-axis position conversion unit converts the relative tool direction into the rotary axis positions of the two rotary axes. And the numerical controller drives the two rotary axes based on the rotary axis positions.

The two rotary axes may be two rotary axes for table rotation and the five-axis machining machine may be a table-rotation type five-axis machining machine.

The two rotary axes may be two rotary axes for tool head rotation and the five-axis machining machine may be a tool head rotation type five-axis machining machine.

Out of the two rotary axes, one may be a rotary axis for table rotation and the other may be a rotary axis for tool head rotation. The five-axis machining machine may be a mixed type five-axis machining machine including one rotary axis for table rotation and one rotary axis for tool head rotation.

One out of the two rotary axes may be a tilted rotary axis that is not horizontal to the three linear axes.

The present invention can provide a numerical controller that enables an input of the relative direction of a tool with respect to a workpiece in manual feeding, in which a direction of a tool with respect to the workpiece can be specified as a vector, roll-pitch-yaw angles, or Euler angles not depending on the axis constitution.

BRIEF DESCRIPTION OF THE DRAWINGS

The above and other objects and features of the present invention will be apparent from the following description of embodiments with reference to the accompanying drawings, in which.

DETAILED DESCRIPTION OF THE PREFERRED EMBODIMENTS

The object of the present invention is to enable an instruction of the direction of a tool with respect to a workpiece in manual feeding as a vector, roll-pitch-yaw angles, or Euler angles not depending on the axis constitution. Embodiments of the present invention will be described below with reference to the drawings.

A (First Embodiment)

Instructions of a Vector, Roll-Pitch-Yaw Angles, and Euler Angles in a Manual Operation in a Table-Rotation Type Five-Axis Machining Machine when a Tilted Rotary Axis is Present Calculation with respect to the table-rotation type five-axis machining machine will be described when a rotary axis is tilted as illustrated in FIGS. 3, 4, 5A, and 5B. More specifically, a B-axis, which is a first rotary axis, is a rotary axis rotated around an axis made by rotating a Y-axis around an X-axis by −45 degrees. A C-axis, which is a second rotary axis, is a rotary axis rotated around a Z-axis when the B-axis is 0 degrees.

Figure 6A:
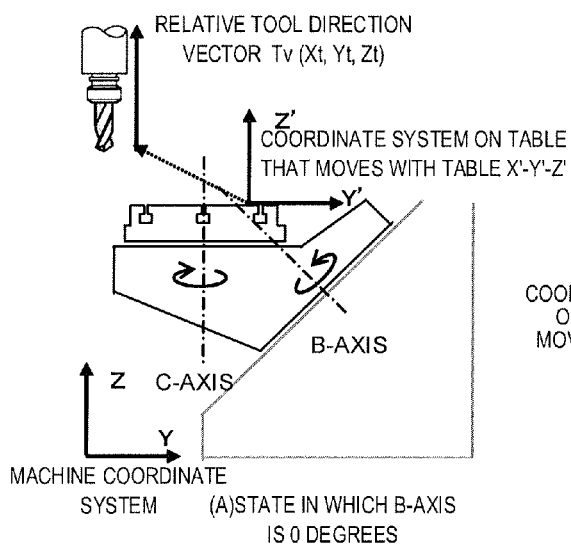
FIGS. 6A and 6B are diagrams illustrating a relative tool direction vector, Tv ((Xt, Yt, Zt)$^T$), viewed from the coordinate system on the table that moves with the table.
Figure 6B:
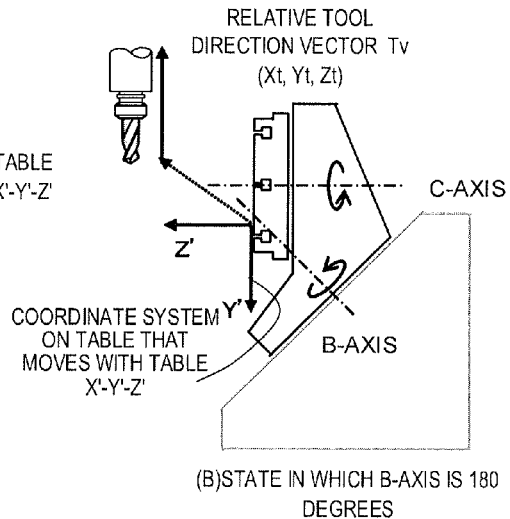

The direction of a tool viewed from a coordinate system on a table that moves with the table is defined as the relative position in the tool direction, which is represented as a relative tool direction vector, Tv ((Xt, Yt, Zt)$^T$) (see FIGS. 6A and 6B). As the method of specifying the direction of the tool, any one is selected from among a vector, roll-pitch-yaw angles, and Euler angles, for which the processing described below in A1, A2, and A3 will be performed, respectively.

A1; Calculation of the End Points of the Rotary Axes when the Direction of the Tool is Specified by a Vector A vector specifying the direction of the tool with respect to the table is acquired. Input for acquiring the vector is performed in a relative tool direction input unit 16 (see FIG. 9). With this machine constitution, when the B-axis being a rotary axis is in the position of B and the C-axis being a rotary axis is in the position of C, the relative tool direction vector, Tv ((Xt, Yt, Zt)$^T$), is obtained by the equation (1) described below.

$$\begin{bmatrix} Xt \\ Yt \\ Zt \end{bmatrix} = Rc * Ra(-45°) * Rb * Ra(45°) * \begin{bmatrix} 0 \\ 0 \\ 1 \end{bmatrix} \quad (1)$$

-continued $$Rb = \begin{bmatrix} \cos B & 0 & \sin B \\ 0 & 1 & 0 \\ -\sin B & 0 & \cos B \end{bmatrix} \cdot Rc = \begin{bmatrix} \cos C & -\sin C & 0 \\ \sin C & \cos C & 0 \\ 0 & 0 & 1 \end{bmatrix}.$$

$$Ra(\pm 45°) = \begin{bmatrix} 1 & 0 & 0 \\ 0 & \cos(\pm 45°) & -\sin(\pm 45°) \\ 0 & \sin(\pm 45°) & \cos(\pm 45°) \end{bmatrix}$$

The vector obtained by the relative tool direction input unit 16 is normalized and the normalized vector is substituted in (Xt, Yt, Zt)$^T$ in the equation (1) to find out B and C, whereby an angle B of the rotary axis B and an angle C of the rotary axis C are calculated. These calculations are performed in a rotary-axis position conversion unit 17 (see FIG. 9). For example, when (1.0, 0, 1.0) is input as the vector specifying the direction of the tool, B=65.530 degrees and C=24.470 degrees are obtained for the end points of the rotary axis B and the rotary axis C.

A2; Calculation of the End Points of the Rotary Axes when the Direction of the Tool is Specified by Roll-Pitch-Yaw Angles A roll angle I, a pitch angle J, and a yaw angle K represent rotation around the X-axis, rotation around the Y-axis, and rotation around the Z-axis on the coordinate system on the table that moves with the table, respectively. In this case, the rotations are made in the order of rotation around the X-axis, rotation around the Y-axis, and rotation around the Z-axis.

The roll angle, the pitch angle, and the yaw angle (I, J, K) specifying the direction of the tool with respect to the table is acquired. Input for acquiring the roll-pitch-yaw angles is performed in the relative tool direction input unit 16 (see FIG. 9). The relative tool direction vector, Tv ((Xt, Yt, Zt)$^T$), based on the roll-pitch-yaw angles is obtained by the equation (2) described below.

$$\begin{bmatrix} Xt \\ Yt \\ Zt \end{bmatrix} = Rk * Rj * Ri * \begin{bmatrix} 0 \\ 0 \\ 1 \end{bmatrix} \quad (2)$$

$$Ri = \begin{bmatrix} 1 & 0 & 0 \\ 0 & \cos I & -\sin I \\ 0 & \sin I & \cos I \end{bmatrix} Rj = \begin{bmatrix} \cos J & 0 & \sin J \\ 0 & 1 & 0 \\ -\sin J & 0 & \cos J \end{bmatrix}$$

$$Rk = \begin{bmatrix} \cos K & -\sin K & 0 \\ \sin K & \cos K & 0 \\ 0 & 0 & 1 \end{bmatrix}$$

The vector (Xt, Yt, Zt)$^T$ obtained by the equation (2) described above that represents the direction of the tool is substituted in the equation (1) to find out B and C, whereby an angle B of the rotary axis B and an angle C of the rotary axis C are calculated. These calculations are performed in the rotary-axis position conversion unit 17 (see FIG. 9). For example, when the roll angle I=0 degrees, the pitch angle J=45 degrees, and the yaw angle K=0 degrees are input as the roll-pitch-yaw angles specifying the direction of the tool, B=65.530 degrees and C=24.470 degrees are obtained for the end points of the rotary axis B and the rotary axis C.

A3; Calculation of the End Points of the Rotary Axes when the Direction of the Tool is Specified by Euler Angles Euler angle (I, J, and K) conversion is defined as below. A coordinate system 1 rotated around the Z-axis for I times is considered as a coordinate system 2. A coordinate system rotated around the X-axis of the coordinate system 2 for J times is considered as a coordinate system 3. A coordinate system rotated around the Z-axis of the coordinate system 3 for K times is considered as a coordinate system 4. Converting the coordinate system 1 into the coordinate system 4 in accordance with the definition described above is considered as the Euler angle conversion. The Euler angles (I, J, K) specifying the direction of the tool with respect to the table is acquired. Input for acquiring the Euler angles is performed in the relative tool direction input unit 16 (see FIG. 9). The relative tool direction vector, Tv ((Xt, Yt, Zt)$^T$), based on the Euler angles is obtained by the equation (3) described below.

$$\begin{bmatrix} Xt \\ Yt \\ Zt \end{bmatrix} = Ri * Rj * Rk * \begin{bmatrix} 0 \\ 0 \\ 1 \end{bmatrix} \quad (3)$$

$$Ri = \begin{bmatrix} \cos I & -\sin I & 0 \\ \sin I & \cos I & 0 \\ 0 & 0 & 1 \end{bmatrix} Rj = \begin{bmatrix} 1 & 0 & 0 \\ 0 & \cos J & -\sin J \\ 0 & \sin J & \cos J \end{bmatrix}$$

$$Rk = \begin{bmatrix} \cos K & -\sin K & 0 \\ \sin K & \cos K & 0 \\ 0 & 0 & 1 \end{bmatrix}$$

Figure 1:
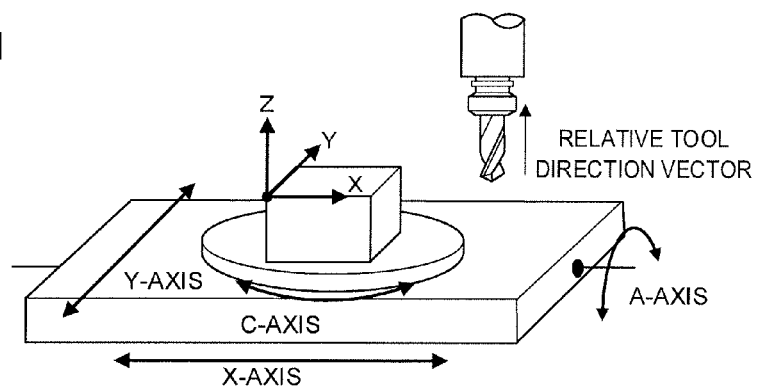
FIG. 1 is a diagram illustrating a table-rotation type five-axis machining machine (with a master axis being A-axis and a slave axis being C-axis).
Figure 2:
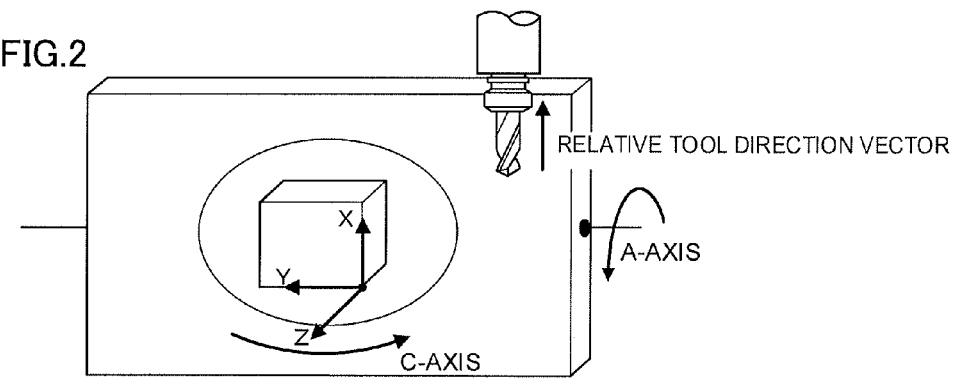
FIG. 2 is a diagram illustrating that calculation of A-axis=90 degrees and C-axis=90 degrees have to be performed based on the rotary axis constitution when the direction of a tool with respect to a workpiece is desired to be the direction of an X-axis.
Figure 3:
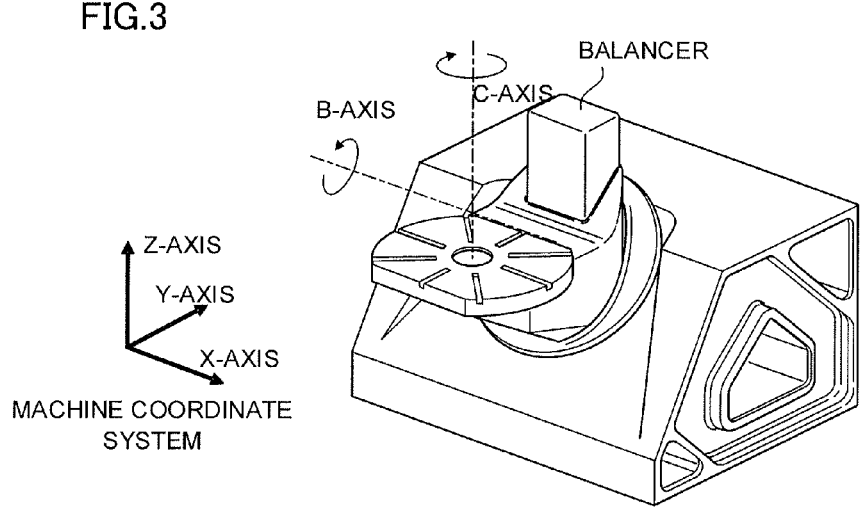
FIG. 3 is a diagram illustrating a rotary axis in a machine in which the rotary axis is tilted.
Figure 4:
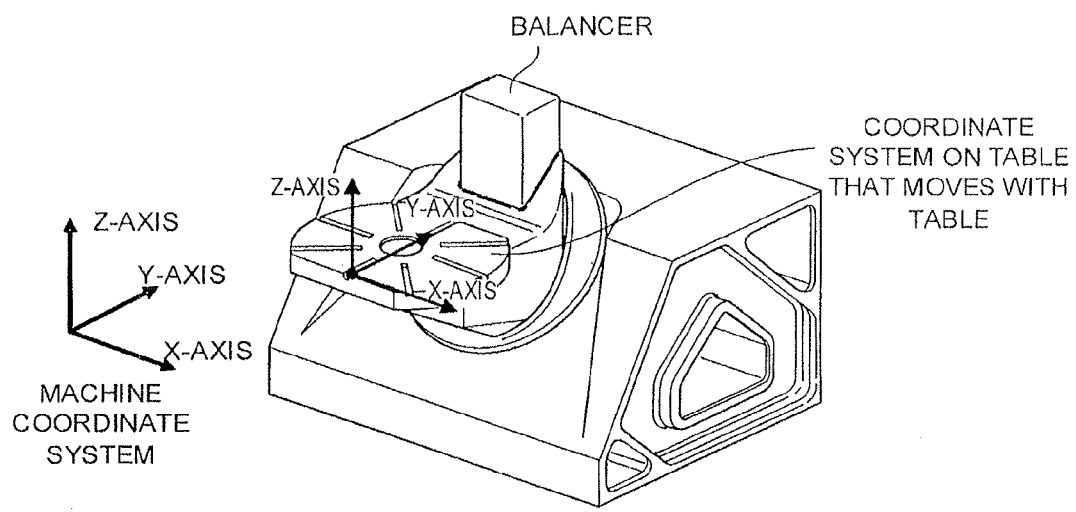
FIG. 4 is a diagram illustrating a coordinate system on a table that moves with the table.
Figure 5A:
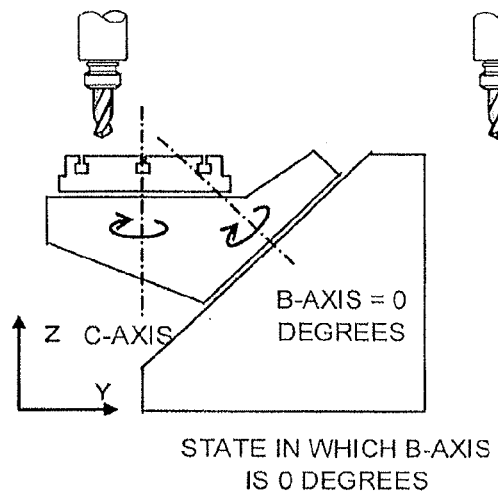
FIG. 5A is a diagram illustrating a state in which a B-axis is 0 degrees and FIG. 5B is a diagram illustrating a state in which a B-axis is 180 degrees, in a machine in which a rotary axis is tilted.
Figure 5B:
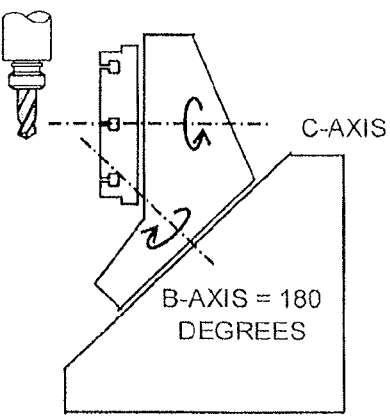

The vector Tv ((Xt, Yt, Zt)$^T$ obtained by the equation (3) described above that represents the direction of the tool is substituted in the equation (1) to find out B and C, whereby an angle B of the rotary axis B and an angle C of the rotary axis C are calculated. These calculations are performed in the rotary-axis position conversion unit 17 (see FIG. 9). For example, when the Euler angles I=90 degrees, J=45 degrees, and K=0 degrees are input as the Euler angles specifying the direction of the tool, B=65.530 degrees and C=24.470 degrees are obtained for the end points of the rotary axis B and the rotary axis C. It should be noted that when no tilted rotary axis is present in the machine constitution as illustrated in FIG. 1, the matrix Ra(±45°) may be omitted from the equation (1).

B (Second Embodiment)

Figure 7:
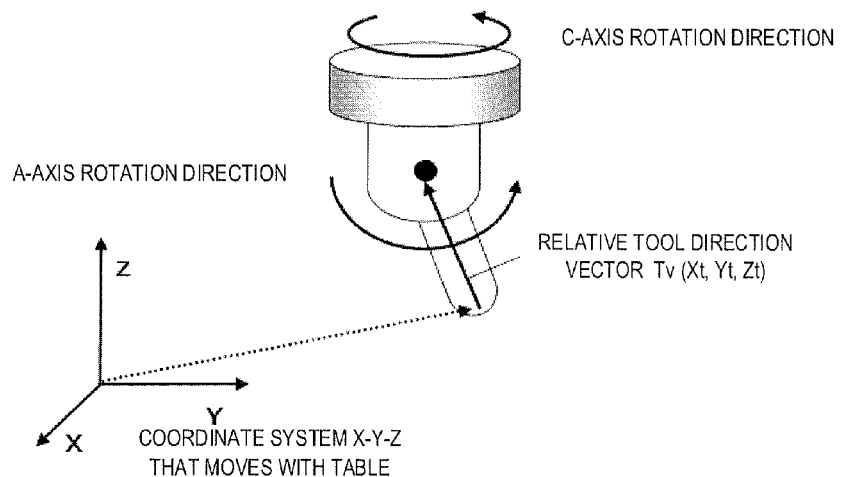
FIG. 7 is a diagram illustrating that the relative tool direction vector, viewed from the coordinate system on the table that moves with the table, is represented as Tv ((Xt, Yt, Zt)$^T$) in a tool head rotation type five-axis machining machine.

Instructions of a Vector, Roll-Pitch-Yaw Angles, and Euler Angles in a Manual Operation in a Tool Head Rotation Type Five-Axis Machining Machine Calculation with respect to the tool head rotation type five-axis machining machine will be described. More specifically, a C-axis, which is a first rotary axis, is a rotary axis rotated around a Z-axis, and an A-axis, which is a second rotary axis, is a rotary axis rotated around an X-axis when the C-axis is 0 degrees. The direction of the tool viewed from a coordinate system on a table that moves with the table is defined as the relative position in the tool direction, which is represented as a relative tool direction vector, Tv ((Xt, Yt, Zt)$^T$) (see FIG. 7). As the method of specifying the direction of the tool, any one is selected from among a vector, roll-pitch-yaw angles, and Euler angles, for which the processing described below in B1, B2, and B3 will be performed, respectively.

B1; Calculation of the End Points of the Rotary Axes when the Direction of the Tool is Specified by a Vector A vector specifying the direction of the tool with respect to the table is acquired. Input for acquiring the vector is performed in the relative tool direction input unit 16 (see FIG. 9). With this machine constitution, when the C-axis being a rotary axis is in the position of C and the A-axis being a rotary axis is in the position of A, the relative tool direction vector, Tv ((Xt, Yt, Zt)$^T$), is obtained by the equation (4) described below.

$$\begin{bmatrix} Xt \\ Yt \\ Zt \end{bmatrix} = Rc * Ra * \begin{bmatrix} 0 \\ 0 \\ 1 \end{bmatrix} \quad (4)$$

$$Ra = \begin{bmatrix} 1 & 0 & 0 \\ 0 & \cos A & -\cos A \\ 0 & \cos A & \cos A \end{bmatrix} \cdot Rc = \begin{bmatrix} \cos C & -\sin C & 0 \\ \sin C & \cos C & 0 \\ 0 & 0 & 1 \end{bmatrix}$$

The vector obtained by the relative tool direction input unit 16 is normalized and the normalized vector is substituted in (Xt, Yt, Zt)$^T$ in the equation (4) to find out C and A, whereby an angle C of the rotary axis C and an angle A of the rotary axis A are calculated. These calculations are performed in the rotary-axis position conversion unit 17 (see FIG. 9). For example, when (1.0, 0, 1.0) is input as the vector specifying the direction of the tool, C=90.000 degrees and A=45.000 degrees are obtained for the end points of the rotary axis C and the rotary axis A.

B2; Calculation of the End Points of the Rotary Axes when the Direction of the Tool is Specified by Roll-Pitch-Yaw Angles A roll angle I, a pitch angle J, and a yaw angle K represent rotation around the X-axis, rotation around the Y-axis, and rotation around the Z-axis on the coordinate system on the table that moves with the table, respectively. In this case, the rotations are made in the order of rotation around the X-axis, rotation around the Y-axis, and rotation around the Z-axis. The roll angle, the pitch angle, and the yaw angles (I, J, K) specifying the direction of the tool with respect to the table is acquired. Input for acquiring the yaw angles is performed in the relative tool direction input unit 16 (see FIG. 9). The relative tool direction vector, Tv ((Xt, Yt, Zt)$^T$), based on the roll-pitch-yaw angles is obtained by the equation (5) described below.

$$\begin{bmatrix} Xt \\ Yt \\ Zt \end{bmatrix} = Rk * Rj * Ri * \begin{bmatrix} 0 \\ 0 \\ 1 \end{bmatrix} \quad (5)$$

$$Ri = \begin{bmatrix} 1 & 0 & 0 \\ 0 & \cos I & -\sin I \\ 0 & \sin I & \cos I \end{bmatrix} Rj = \begin{bmatrix} \cos J & 0 & \sin J \\ 0 & 1 & 0 \\ -\sin J & 0 & \cos J \end{bmatrix}$$

$$Rk = \begin{bmatrix} \cos K & -\sin K & 0 \\ \sin K & \cos K & 0 \\ 0 & 0 & 1 \end{bmatrix}$$

The vector (Xt, Yt, Zt)$^T$ obtained by the equation (5) described above that represents the direction of the tool is substituted in the equation (4) to find out C and A, whereby an angle C of the rotary axis C and an angle A of the rotary axis A are calculated. These calculations are performed in the rotary-axis position conversion unit 17 (see FIG. 9). For example, when the roll angle I=0 degrees, the pitch angle J=45 degrees, and the yaw angle K=0 degrees are input as the roll-pitch-yaw angles specifying the direction of the tool, C=90.000 degrees and A=45.000 degrees are obtained for the end points of the rotary axis C and the rotary axis A.

B3; Calculation of the End Points of the Rotary Axes when the Direction of the Tool is Specified by Euler Angles Euler angle (I, J, and K) conversion is defined as below. A coordinate system 1 rotated around the Z-axis for I times is considered as a coordinate system 2. A coordinate system rotated around the X-axis of the coordinate system 2 for J times is considered as a coordinate system 3. A coordinate system rotated around the Z-axis of the coordinate system 3 for K times is considered as a coordinate system 4. Converting the coordinate system 1 into the coordinate system 4 in accordance with the definition described above is considered as the Euler angle conversion. The Euler angles (I, J, K) specifying the direction of the tool with respect to the table is acquired. Input for acquiring the Euler angles is performed in the relative tool direction input unit 16 (see FIG. 9). The relative tool direction vector, Tv ($(Xt, Yt, Zt)^T$), based on the Euler angles is obtained by the equation (6) described below.

$$\begin{bmatrix} Xt \\ Yt \\ Zt \end{bmatrix} = Ri * Rj * Rk * \begin{bmatrix} 0 \\ 0 \\ 1 \end{bmatrix} \quad (6)$$

$$Ri = \begin{bmatrix} \cos I & -\sin I & 0 \\ \sin I & \cos I & 0 \\ 0 & 0 & 1 \end{bmatrix} Rj = \begin{bmatrix} 1 & 0 & 0 \\ 0 & \cos J & -\sin J \\ 0 & \sin J & \cos J \end{bmatrix}$$

$$Rk = \begin{bmatrix} \cos K & -\sin K & 0 \\ \sin K & \cos K & 0 \\ 0 & 0 & 1 \end{bmatrix}$$

The vector $(Xt, Yt, Zt)^T$ obtained by the equation (6) described above that represents the direction of the tool is substituted in the equation (4) to find out C and A, whereby an angle C of the rotary axis C and an angle A of the rotary axis A are calculated. These calculations are performed in the rotary-axis position conversion unit 17 (see FIG. 9). For example, when the Euler angles I=90 degrees, J=45 degrees, and K=0 degrees are input as the Euler angles specifying the direction of the tool, C=90.000 degrees and A=45.000 degrees are obtained for the end points of the rotary axis C and the rotary axis A.

It should be noted that in the second embodiment described above, a tool head rotation type five-axis machining machine as described in the first embodiment can be applied. In that case, multiplication of Ra(±α), Rb(±β), or Rc(±γ) as described in the equation (1) in the first embodiment may be performed in the equation (4). At this point, Ra(±α) represents that the rotary axis is tilted by α around the X-axis, Rb(±β) represents that the rotary axis is tilted by around the Y-axis, or Rc(±γ) represents that the rotary axis is tilted by γ around the Z-axis. The equation (1) is an example with α=45°. Specific calculations are omitted. Furthermore, similar calculations are performed in the equation (7) in a third embodiment described later.

C (Third Embodiment)

Figure 8:
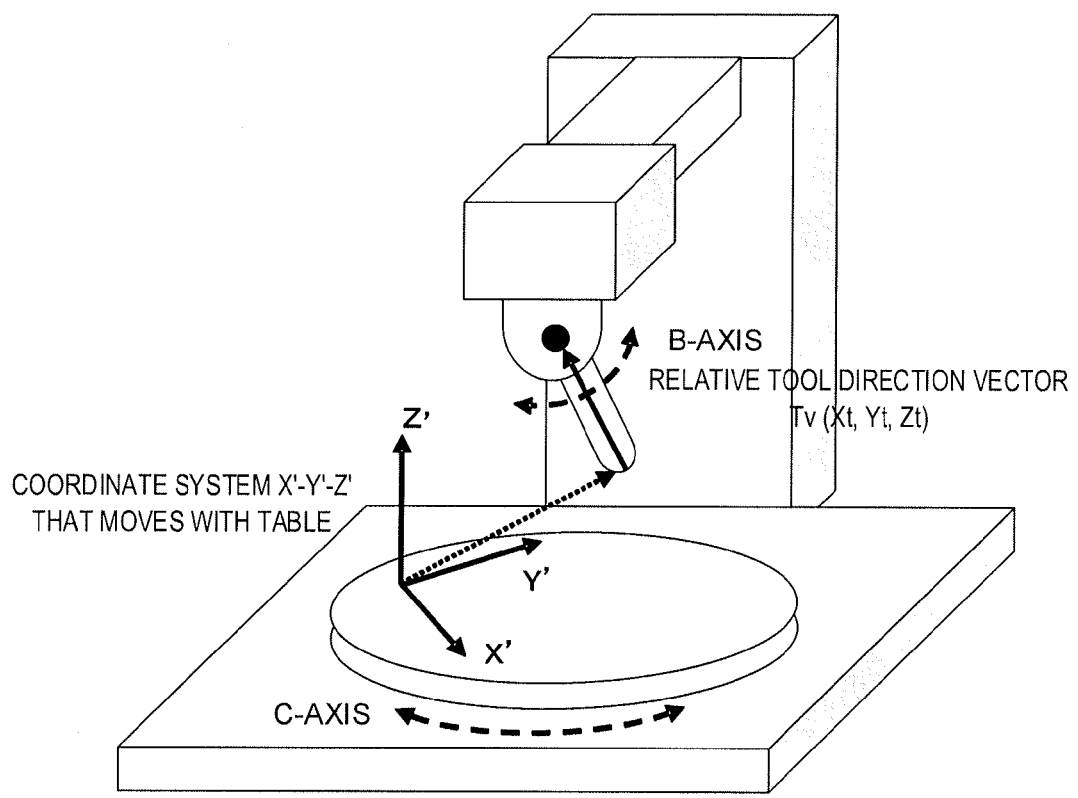
FIG. 8 is a diagram illustrating that the relative tool direction vector, viewed from the coordinate system on the table that moves with the table, is represented as Tv ((Xt, Yt, Zt)$^T$) in a mixed type five-axis machining machine.

Instructions of a Vector, Roll-Pitch-Yaw Angles, or Euler Angles in a Manual Operation in a Mixed Type Five-Axis Machining Machine Calculation with respect to the mixed type five-axis machining machine will be described. More specifically, a B-axis, which is a tool rotary axis, is a rotary axis rotated around a Y-axis, and a C-axis, which is a table rotary axis, is a rotary axis rotated around a Z-axis. The direction of the tool viewed from a coordinate system on a table that moves with the table is defined as the relative position in the tool direction, which is represented as a relative tool direction vector, Tv ($(Xt, Yt, Zt)^T$) (see FIG. 8). It should be noted that the positive direction of the C-axis is the clockwise direction when the table is viewed from above in FIG. 8. As the method of specifying the direction of the tool, any one is selected from among a vector, roll-pitch-yaw angles, and Euler angles, for which the processing described below in C1, C2, and C3 will be performed, respectively.

C1; Calculation of the End Points of the Rotary Axes when the Direction of the Tool is Specified by a Vector A vector specifying the direction of the tool with respect to the table is acquired. Input for acquiring the vector is performed in the relative tool direction input unit 16 (see FIG. 9). With this machine constitution, when the B-axis being a rotary axis is in the position of B and the C-axis being a rotary axis is in the position of C, the relative tool direction vector, Tv ($(Xt, Yt, Zt)^T$), is obtained by the equation (7) described below.

$$\begin{bmatrix} Xt \\ Yt \\ Zt \end{bmatrix} = Rc * Rb * \begin{bmatrix} 0 \\ 0 \\ 1 \end{bmatrix} \quad (7)$$

$$Rb = \begin{bmatrix} \cos B & 0 & \sin B \\ 0 & 1 & 0 \\ -\sin B & 0 & \cos B \end{bmatrix} \cdot Rc = \begin{bmatrix} \cos C & -\sin C & 0 \\ \sin C & \cos C & 0 \\ 0 & 0 & 1 \end{bmatrix}$$

The vector obtained by the relative tool direction input unit 16 is normalized and the normalized vector is substituted in $(Xt, Yt, Zt)^T$ in the equation (7) to find out B and C, whereby an angle B of the rotary axis B and an angle C of the rotary axis C are calculated. These calculations are performed in the rotary-axis position conversion unit 17 (see FIG. 9). For example, when (1.0, 0, 1.0) is input as the vector specifying the direction of the tool, B=45.000 degrees and C=0.000 degrees are obtained for the end points of the rotary axis B and the rotary axis C.

C2; Calculation of the End Points of the Rotary Axes when the Direction of the Tool is Specified by Roll-Pitch-Yaw Angles A roll angle I, a pitch angle J, and a yaw angle K represent rotation around the X-axis, rotation around the Y-axis, and rotation around the Z-axis on the coordinate system on the table that moves with the table, respectively. In this case, the rotations are made in the order of rotation around the X-axis, rotation around the Y-axis, and rotation around the Z-axis. The roll angle, the pitch angle and the yaw angle (I, J, K) specifying the direction of the tool with respect to the table is acquired. Input for acquiring the roll-pitch-yaw angles is performed in the relative tool direction input unit 16 (see FIG. 9). The relative tool direction vector, Tv ($(Xt, Yt, Zt)^T$), based on the roll-pitch-yaw angles is obtained by the equation (8) described below.

$$\begin{bmatrix} Xt \\ Yt \\ Zt \end{bmatrix} = Rk * Rj * Ri * \begin{bmatrix} 0 \\ 0 \\ 1 \end{bmatrix} \quad (8)$$

-continued $$Ri = \begin{bmatrix} 1 & 0 & 0 \\ 0 & \cos I & -\sin I \\ 0 & \sin I & \cos I \end{bmatrix} Rj = \begin{bmatrix} \cos J & 0 & \sin J \\ 0 & 1 & 0 \\ -\sin J & 0 & \cos J \end{bmatrix}$$

$$Rk = \begin{bmatrix} \cos K & -\sin K & 0 \\ \sin K & \cos K & 0 \\ 0 & 0 & 1 \end{bmatrix}$$

The vector $(Xt, Yt, Zt)^T$ obtained by the equation (8) described above that represents the direction of the tool is substituted in the equation (7) to find out B and C, whereby an angle B of the rotary axis B and an angle C of the rotary axis C are calculated. These calculations are performed in the rotary-axis position conversion unit 17 (see FIG. 9). For example, when the roll angle I=0 degrees, the pitch angle J=45 degrees, and the yaw angle K=0 degrees are input as the roll-pitch-yaw angles specifying the direction of the tool, B=45.000 degrees and C=0.000 degrees are obtained for the end points of the rotary axis B and the rotary axis C.

C3; Calculation of the End Points of the Rotary Axes when the Direction of the Tool is Specified by Euler Angles Euler angle (I, J, and K) conversion is defined as below. A coordinate system 1 rotated around the Z-axis for I times is considered as a coordinate system 2. A coordinate system rotated around the X-axis of the coordinate system 2 for J times is considered as a coordinate system 3. A coordinate system rotated around the Z-axis of the coordinate system 3 for K times is considered as a coordinate system 4. Converting the coordinate system 1 into the coordinate system 4 in accordance with the definition described above is considered as the Euler angle conversion. The Euler angles (I, J, K) specifying the direction of the tool with respect to the table is acquired. Input for acquiring the Euler angles is performed in the relative tool direction input unit 16 (see FIG. 9). The relative tool direction vector, Tv $((Xt, Yt, Zt)^T)$, based on the Euler angles is obtained by the equation (9) described below.

$$\begin{bmatrix} Xt \\ Yt \\ Zt \end{bmatrix} = Ri * Rj * Rk * \begin{bmatrix} 0 \\ 0 \\ 1 \end{bmatrix} \quad (9)$$

$$Ri = \begin{bmatrix} \cos I & -\sin I & 0 \\ \sin I & \cos I & 0 \\ 0 & 0 & 1 \end{bmatrix} Rj = \begin{bmatrix} 1 & 0 & 0 \\ 0 & \cos J & -\sin J \\ 0 & \sin J & \cos J \end{bmatrix}$$

$$Rk = \begin{bmatrix} \cos K & -\sin K & 0 \\ \sin K & \cos K & 0 \\ 0 & 0 & 1 \end{bmatrix}$$

The vector $(Xt, Yt, Zt)^T$ obtained by the equation (9) described above that represents the direction of the tool is substituted in the equation (7) to find out B and C, whereby an angle B of the rotary axis B and an angle C of the rotary axis C are calculated. These calculations are performed in the rotary-axis position conversion unit 17 (see FIG. 9). For example, when the Euler angles I=90 degrees, J=45 degrees, and K=0 degrees are input as the Euler angles specifying the direction of the tool, B=45.000 degrees and C=0.000 degrees are obtained for the end points of the rotary axis B and the rotary axis C.

Figure 9:
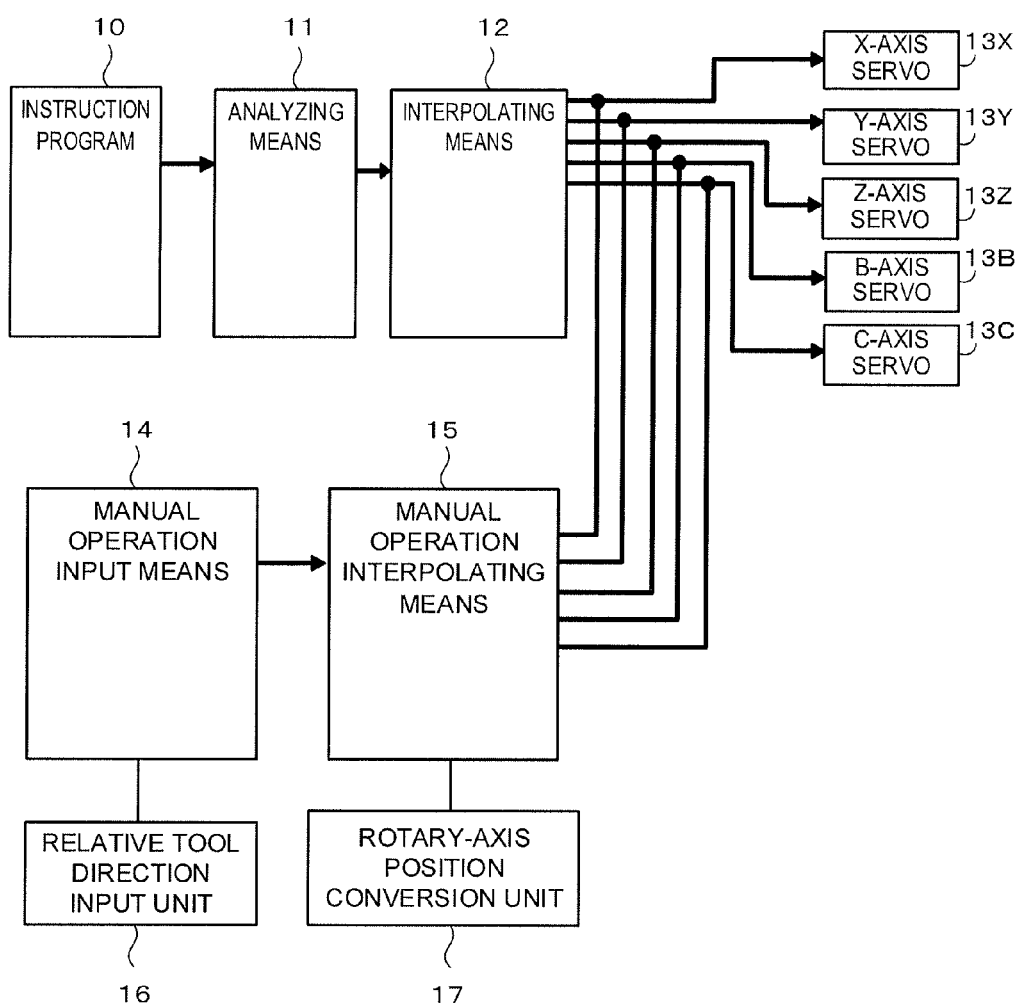
FIG. 9 is a block diagram illustrating a numerical controller enabling an input of the relative direction of a tool with respect to a workpiece according to the present invention.

FIG. 9 is a block diagram illustrating a numerical controller enabling an input of the relative tool direction with respect to a workpiece according to the present invention.

Generally, in the numerical controller, an instruction program 10 is analyzed by an analyzing means 11 and interpolated by an interpolating means 12, whereby a servo of each axis is driven. In the case of a manual operation, a manual operation interpolating means 15 receives an instruction from a manual operation input means 14 such as handle feeding, jog feeding, and incremental feeding for each interpolation period and starts up the servo of each axis (an X-axis servo 13X, a Y-axis servo 13Y, a Z-axis servo 13Z, a B-axis servo 13B, and a C-axis servo 13C). The relative tool direction input unit 16 illustrated in FIG. 9 belongs to the manual operation input means 14 and the rotary-axis position conversion unit 17 belongs to the manual operation interpolating means 15. It is a prior art technique that the manual operation interpolating means 15 performs interpolation to drive two rotary axes to the rotary axis positions in accordance with the conversion performed by the rotary-axis position conversion unit 17. The detailed description of this technique is thus omitted.

Figure 10:
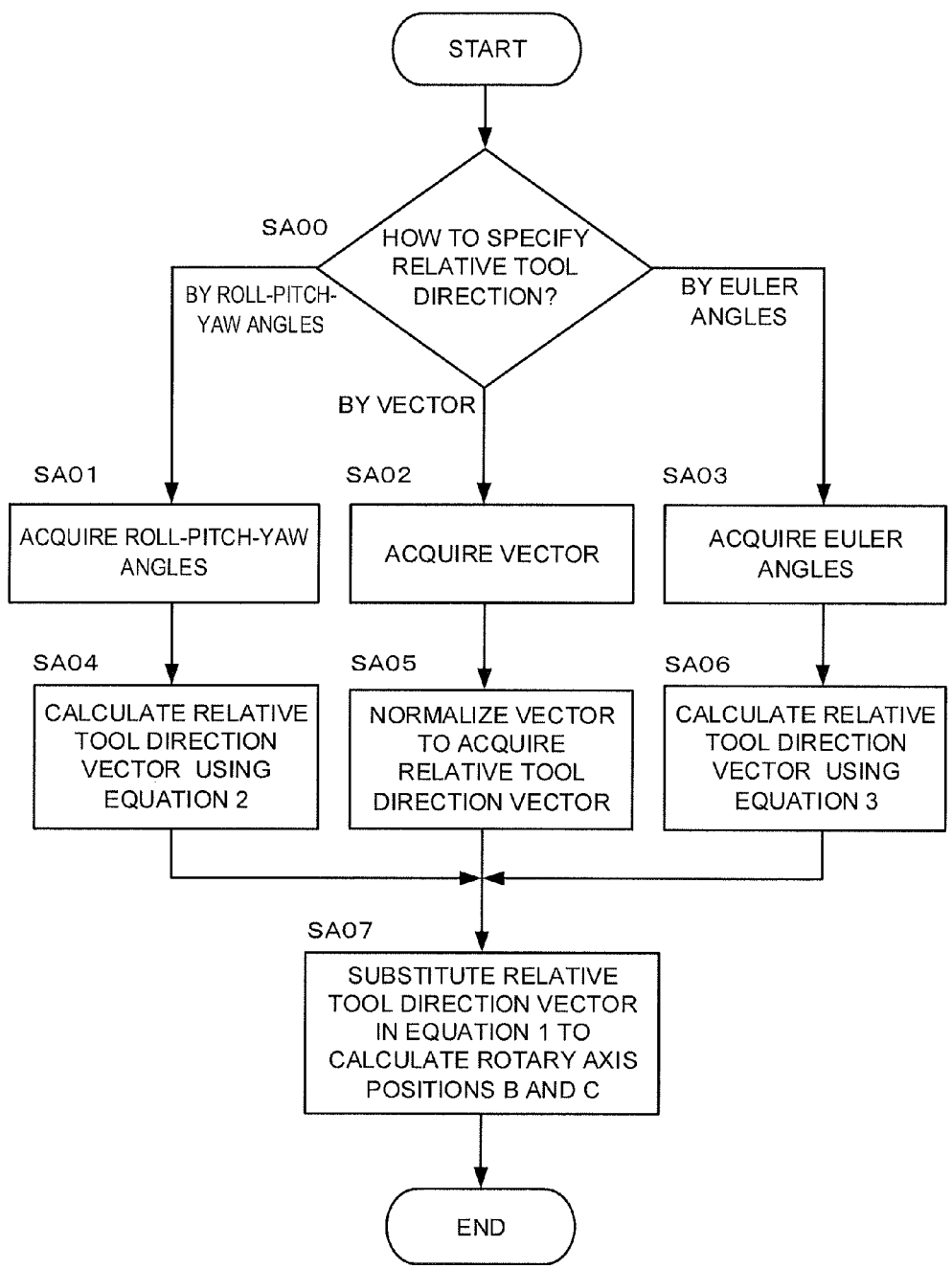
FIG. 10 is a flowchart explaining the flow of processing in a relative tool direction input unit and a rotary-axis position conversion unit in a numerical controller according to a first embodiment of the present invention.
Figure 11:
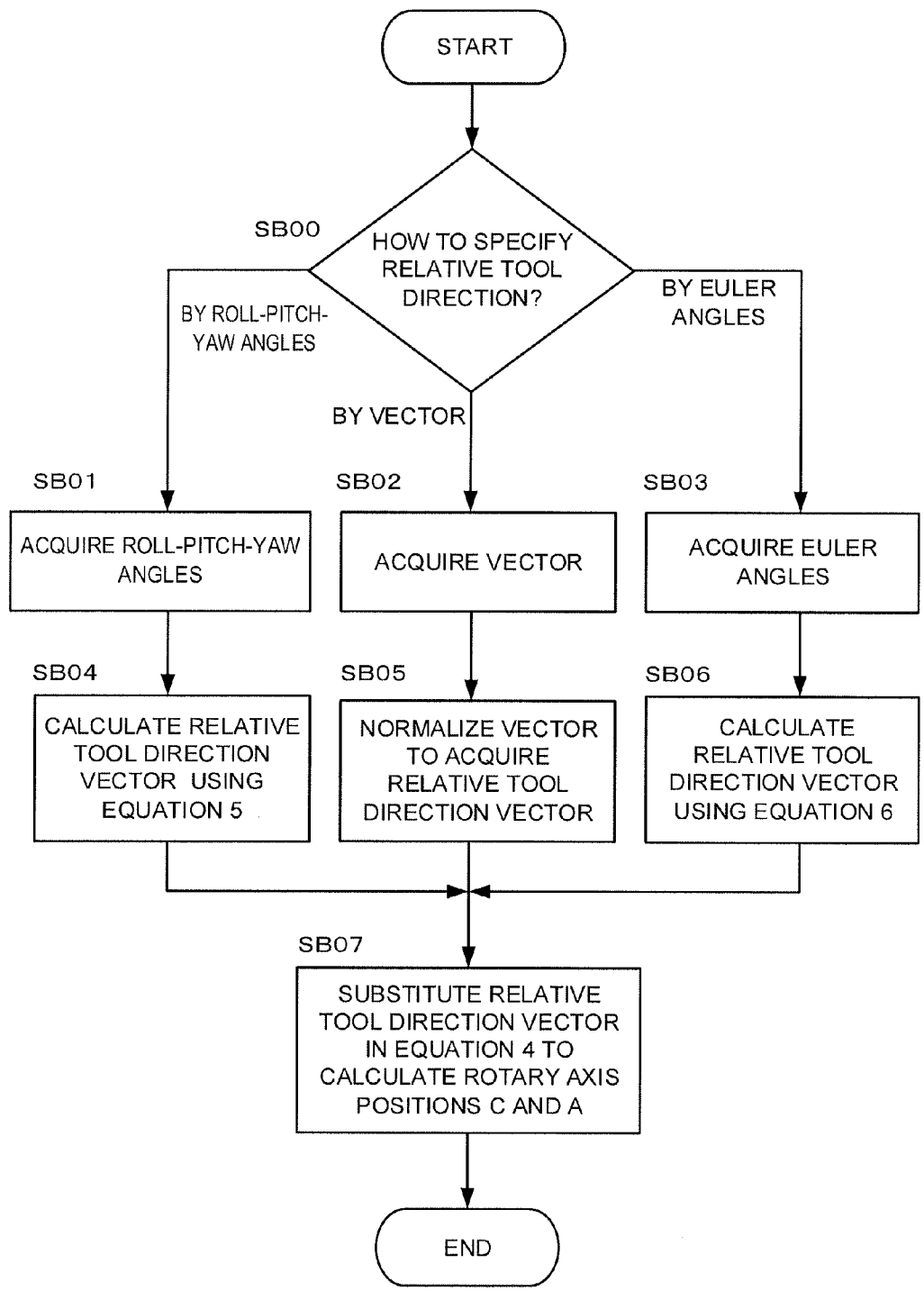
FIG. 11 is a flowchart explaining the flow of processing in a relative tool direction input unit and a rotary-axis position conversion unit in a numerical controller according to a second embodiment of the present invention.
Figure 12:
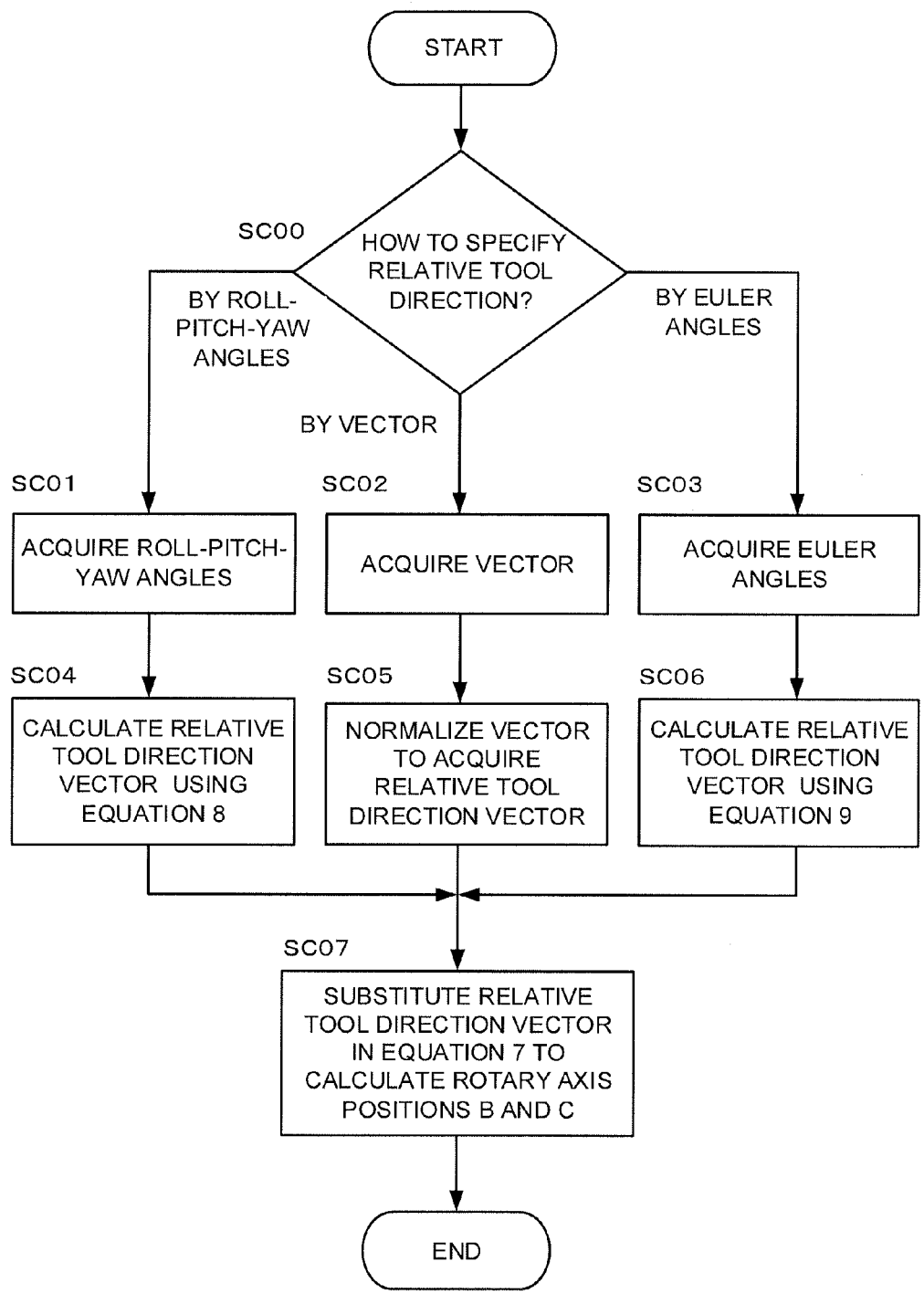
FIG. 12 is a flowchart explaining the flow of processing in a relative tool direction input unit and a rotary-axis position conversion unit in a numerical controller according to a third embodiment of the present invention.

Flows of processing performed by the relative tool direction input unit 16 and the rotary-axis position conversion unit 17 in each of the embodiments, which will be described below, are illustrated in FIGS. 10, 11, and 12.

Firstly, flows of processing performed by the relative tool direction input unit 16 and the rotary-axis position conversion unit 17 in the first embodiment will be described with reference to the flowchart illustrated in FIG. 10.

[Step SA00] The specifying method of the relative tool direction is determined. When roll-pitch-yaw angles are used, the processing proceeds to Step SA01. When a vector is used, the processing proceeds to Step SA02. When Euler angles are used, the processing proceeds to Step SA03.

[Step SA01] Roll-pitch-yaw angles are acquired, and the processing proceeds to Step SA04.

[Step SA02] A relative tool direction vector is acquired.

[Step SA03] Euler angles are acquired.

[Step SA04] The relative tool direction vector is calculated using the equation (2), and the processing proceeds to Step SA07.

[Step SA05] The relative tool direction vector is normalized.

[Step SA06] The relative tool direction vector is calculated using the equation (3), and the processing proceeds to Step SA07.

[Step SA07] The relative tool direction vector is substituted in the equation (1) to calculate the rotary axis positions B and C.

Next, flows of processing performed by the relative tool direction input unit 16 and the rotary-axis position conversion unit 17 in the second embodiment will be described with reference to the flowchart illustrated in FIG. 11.

[Step SB00] The specifying method of the relative tool direction is determined. When roll-pitch-yaw angles are used, the processing proceeds to Step SB01. When a vector is used, the processing proceeds to Step SB02. When Euler angles are used, the processing proceeds to Step SB03.

[Step SB01] Roll-pitch-yaw angles are acquired, and the processing proceeds to Step SB04.

[Step SB02] A relative tool direction vector is acquired.

[Step SB03] Euler angles are acquired.

[Step SB04] The relative tool direction vector is calculated using the equation (5), and the processing proceeds to Step SB07.

[Step SB05] The relative tool direction vector is normalized.

[Step SB06] The relative tool direction vector is calculated using the equation (6), and the processing proceeds to Step SB07.

[Step SB07] The relative tool direction vector is substituted in the equation (4) to calculate the rotary axis positions C and A.

Next, flows of processing performed by the relative tool direction input unit 16 and the rotary-axis position conversion unit 17 in the third embodiment will be described with reference to the flowchart illustrated in FIG. 12.

[Step SC00] The specifying method of the relative tool direction is determined. When roll-pitch-yaw angles are used, the processing proceeds to Step SC01. When a vector is used, the processing proceeds to Step SC02. When Euler angles are used, the processing proceeds to Step SC03.

[Step SC01] Roll-pitch-yaw angles are acquired, and the processing proceeds to Step SC04.

[Step SC02] A relative tool direction vector is acquired.

[Step SC03] Euler angles are acquired.

[Step SC04] The relative tool direction vector is calculated using the equation (8), and the processing proceeds to Step SC07.

[Step SC05] The relative tool direction vector is normalized.

[Step SC06] The relative tool direction vector is calculated using the equation (a), and the processing proceeds to Step SC07.

[Step SC07] The relative tool direction vector is substituted in the equation (7) to calculate the rotary axis positions B and C.

The invention claimed is:

1. A numerical controller controlling a five-axis machining machine that machines a workpiece attached to a table with three linear axes and two rotary axes, the numerical controller comprising:

a relative tool direction input unit that inputs by a manual operation a relative tool direction representing a relative position of the tool direction with respect to the workpiece after the rotary axes are moved, as a vector, roll-pitch-yaw angles, or Euler angles; and a rotary-axis position conversion unit that converts the relative tool direction into the rotary axis positions of the two rotary axes, wherein the numerical controller drives the two rotary axes based on the rotary axis positions.

2. The numerical controller according to claim 1, wherein the two rotary axes are two rotary axes for table rotation and the five-axis machining machine is a table-rotation type five-axis machining machine.

3. The numerical controller according to claim 2, wherein one out of the two rotary axes is a tilted rotary axis that is not horizontal to the three linear axes.

4. The numerical controller according to claim 1, wherein the two rotary axes are two rotary axes for tool head rotation and the five-axis machining machine is a tool head rotation type five-axis machining machine.

5. The numerical controller according to claim 4, wherein one out of the two rotary axes is a tilted rotary axis that is not horizontal to the three linear axes.

6. The numerical controller according to claim 1, wherein, out of the two rotary axes, one is a rotary axis for table rotation and the other is a rotary axis for tool head rotation, and the five-axis machining machine is a mixed type five-axis machining machine including one rotary axis for table rotation and one rotary axis for tool head rotation.

7. The numerical controller according to claim 6, wherein one out of the two rotary axes is a tilted rotary axis that is not horizontal to the three linear axes.

8. The numerical controller according to claim 1, wherein one out of the two rotary axes is a tilted rotary axis that is not horizontal to the three linear axes.

* * * * *